July 6, 1943.  E. F. HOLT  2,323,660
FLASH-ARC WELDING
Filed March 7, 1942
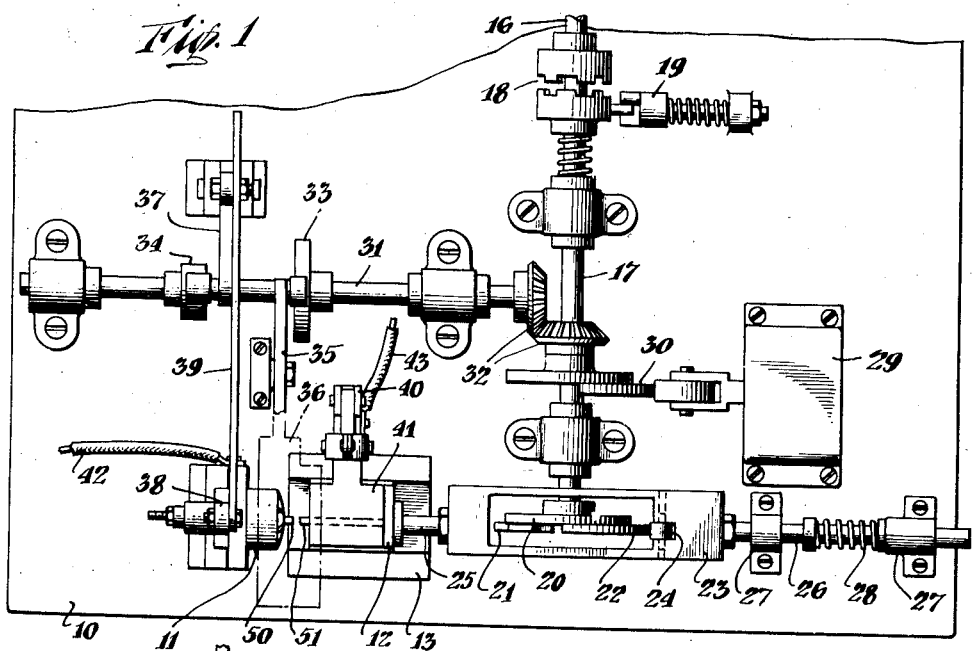
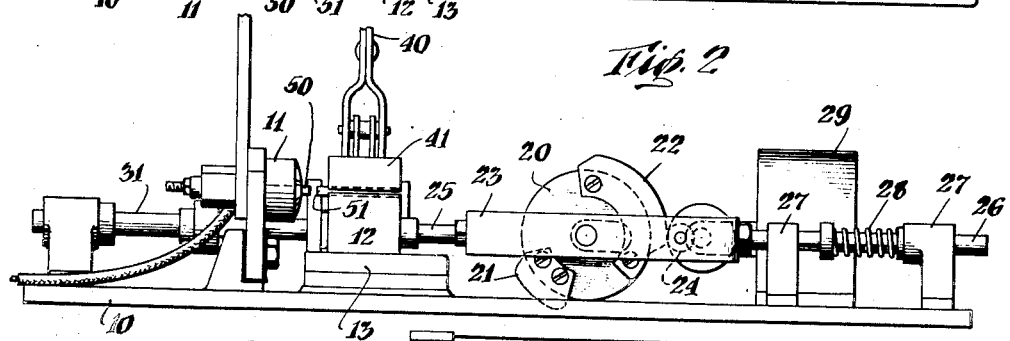
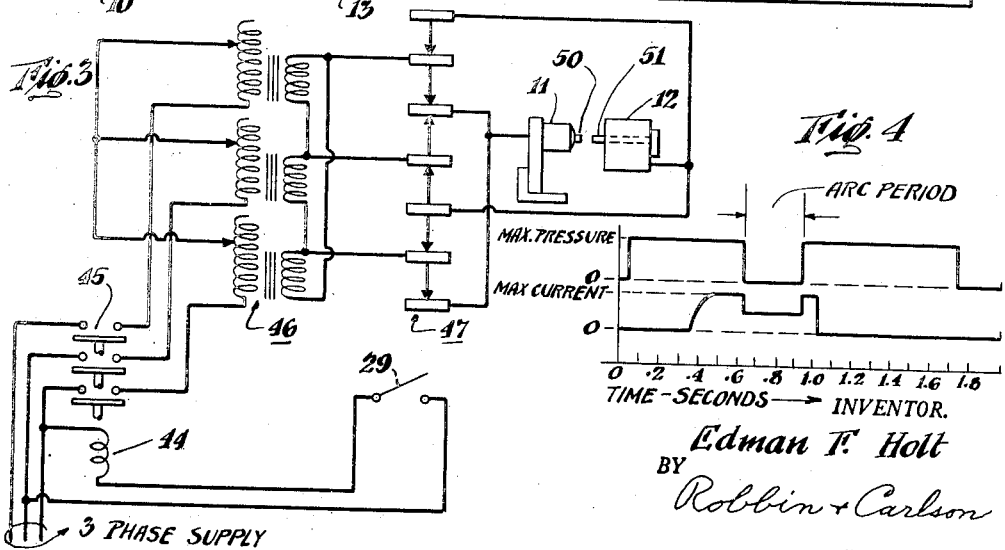
INVENTOR.
Edman F. Holt
BY Robbin + Carlson
ATTORNEYS Patented July 6, 1943

2,323,660

UNITED STATES PATENT OFFICE 2,323,660

FLASH-ARC WELDING

Edman Francis Holt, Indianapolis, Ind., assignor to P. R. Mallory & Co., Inc., Indianapolis, Ind., a corporation of Delaware Application March 7, 1942, Serial No. 433,720

6 Claims. (Cl. 219—10)

This invention relates to electric welding.

An object of the invention is to improve the method of welding metal parts together.

Another object is to improve the method for butt welding dissimilar metals.

A further object is to improve the method of butt welding rod sections together end to end, particularly when the parts to be welded are formed of dissimilar metals.

Other objects of the invention will be apparent from the following description and accompanying drawing taken in connection with the appended claims.

The invention comprises the methods of manufacture and operation referred to above or which will be brought out and exemplified in the disclosure hereinafter set forth, including the illustrations in the drawing.

In the drawing:

Figure 1 is a top plan view of a welding machine for flash-arc welding;

Figure 2 is a side elevation thereof;

Figure 3 is a diagram of the welding circuit; and

Figure 4 is a diagram showing graphically the pressure and current sequence during welding.

In the preferred method of carrying out the welding operation in accordance with my invention, the parts to be welded, such as two rod sections to be welded together end to end, are brought into end-to-end pressure contact and the terminals of a source of electric current are connected to the two parts respectively to pass electric current through the abutting ends. The parts are then separated slightly to draw an arc. The arc is maintained for a period of time sufficient to raise the ends of the parts to welding temperatures, after which they are rapidly forced together and the current is cut off, the weld then being complete.

According to one feature of the present invention, where parts of different metallurgical composition and different softening temperatures are to be welded together, I prefer to use a direct current source for producing the arc and making the part requiring the most heat the anode or positive terminal of the arc circuit, while the part requiring a lesser degree of heat is made the cathode or negative terminal. I have found that considerably more heat is developed at the anode than at the cathode in an arc and by connecting the parts in this way the metal at the arcing end of the anode part is heated to a considerably higher temperature than the end of the rod constituting the cathode. It is thus possible to weld together dissimilar metals, such as nickel and tungsten, or ferrous base, nickel base or other alloys to tungsten, molybdenum or other refractory metals or refractory metal compositions containing a substantial proportion of these metals. The two parts are brought to different welding temperatures, which are suitable for each, and when the parts are brought together, a satisfactory weld is effected.

The welding sequence is preferably accomplished, according to my invention, by the apparatus to be described which is largely automatic in operation. The apparatus includes current conducting supports which hold the parts to be welded and are relatively movable to bring them together and then separate as required by the welding cycle. The novel features of the machine will be apparent from the following detailed description. One feature of some considerable importance is the automatic mechanism for releasing one of the parts from its holding chuck as soon as the weld has been completed and before the holders are automatically separated by the cams. This prevents undue strain being placed on the weld, while it is still hot and has not yet reached its full strength, and this also performs the initial step of removing the welded assembly from the machine. Other features of the welding machine and the method will be apparent from the following.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawing, the machine illustrated in Figures 1 and 2 comprise a bed plate 10 upon which most of the machine parts are mounted. The rod sections 50 and 51 to be welded together are held in a stationary chuck 11 and a sliding holder block 12 which can slide back and forth in a guideway 13 mounted on the bed plate and thereby move part 51 into and out of contact with part 50 held in stationary chuck 11.

The machine is driven by an electric motor through a gear box which drives shaft 16. Shaft 16 drives an intermittently operated shaft 17 through a non-repeat clutch 18 controlled by a foot operated lever 19.

A disc 20 is mounted on the forward end of shaft 17 and carries a pair of cam segments 21 and 22. A rectangular yoke or frame 23 straddles the disc 20 and carries a small roller 24 which is engaged by the segments during rotation of the disc. Yoke 23 is aligned with slide 12 and connected thereto by a connecting rod 25. A slide rod 26 projects from the opposite end of yoke 23 and slides in suitable guides 27 mounted on the bed plate. A coil compression spring 28 surrounds slide rod 26 between guides 27 and is under compression to urge yoke 23 and connected slide 12 toward the stationary chuck 11. It will thus be evident that during rotation of disc 20 by shaft 17 cams 21 and 22 will alternately engage roller 24 to retract slide 12 against the pressure of spring 28 to thereby separate the parts to be welded, and that as the roller 24 passes off each cam, spring 28 will force the parts together.

An electric switch 29 is mounted on bed plate 10 and is under control of a cam segment 30 mounted on shaft 17 to close and open the welding circuit in proper sequence with the mechanical manipulation of the parts.

An auxiliary shaft 31 is driven by shaft 17 through gears 32. Shaft 31 carries cams 33 and 34 for controlling auxiliary functions of the machine. Cam 33 operates tilt lever 35 which carries a protective hood 36 which is brought down over the electrodes during welding. Cam 34 controls lever 37 which is connected to chuck release lever 38 by bar 39 to release the grip of chuck 11 on part 50 as soon as the weld is completed so as to avoid placing any strain on the welded parts as slide 12 is backed away by the control cam.

Lever 38 can also be operated by hand to tighten the chuck when rod 50 is inserted in it for welding or to release the chuck at any other time. Another hand operated lever 40 is supported on slide 12 and carries a clamping bar 41 which can be brought down on top of slide 12 by operation of the lever to clamp the part 51 to be welded. The conductors 42 and 43 of the welding circuit are connected to chuck 11 and slide 12, respectively, the support for chuck 11 being insulated from the bed of the machine.

The preferred welding circuit is shown in Figure 3. In the circuit of Figure 3 the current source is a 3-phase A. C. supply system. Cam operated control switch 29 connects an electromagnet 44 of a 3-pole magnetic contactor 45 across one pair of the 3-phase conductors. On closing, contactor 45 connects the 3-phase supply to the tapped primary windings of a 3-phase transformer bank 46. The secondary of the transformer is connected through a 3-phase rectifier 47 to the chuck 11 and slide 12 carrying the parts to be welded.

This circuit produces a rapid build-up of welding current from zero to maximum value when the contactor is closed. It is desirable that the welding current increase from zero to at least 95% of its maximum steady state value within about 0.1 second after the switch is closed. The circuit shown also has the advantage of providing a balanced load on the 3-phase A. C. supply circuit. The taps on the transformer provide a means for varying the voltage impressed on the rectifier and, in turn, upon the parts to be welded. The rectifier may preferably be of the dry disc type, but may be of any type which has a quick electrical response. If desired, a ballast resistor may be connected in series with the D. C. circuit to provide a means for controlling short circuit peak current values during continuous operation of the equipment.

Depending on the setting of the welding transformer, the open circuit direct current voltage applied to the terminals may vary over a considerable range of values. Suitable values for welding tungsten to nickel alloys have been found to be between 30 and 50 volts D. C. When the circuit is closed, the output D. C. voltage at the rectifier may drop to between 25 and 40 volts and during arcing the current may amount to 150 to 220 amperes. The above figures are given by way of example only and should not be construed as a limitation upon the process except in so far as is brought out in the appended claims.

The operation of the welder in butt welding a 0.16 inch diameter rod of tungsten to a rod of nickel alloy of the same diameter is as follows:

The parts to be welded are loaded in the chuck 11 and on top of slide block 12, respectively, with the tungsten part connected to the anode of the power supply circuit. At this time cam 22 is engaging roller 24 and holding slide 12 retracted away from chuck 11 so that the parts are not in contact. To initiate the welding cycle, the operator presses a foot pedal (not shown) which controls lever 19 to allow the parts of clutch 18 to come into engagement. Rotating shaft 16 immediately starts to drive shaft 17 with it at its normal rotating speed. After a few degrees of rotation cam 33 brings hood 36 down over the work to be welded and roller 24 rolls off the end of cam segment 22, allowing spring 28 to force the parts into end-to-end abutment. A short time thereafter cam 30 closes switch 29 to close the welding circuit and the current through the parts rapidly builds up to its maximum value determined by the setting of the welding circuit. After the current has flowed for a short time, such as about 0.2 second, cam segment 21 engages roller 24 to separate the rod sections and since current is being applied, a D. C. arc is drawn between the parts.

The distance the parts are separated during the arc period is, of course, determined by the height of cam segment 21 and may amount to about 0.1 inch, for example. The arc is maintained for a time which may be determined experimentally for the material to be welded and may in the present example be 0.3 to 0.4 second. Cam segment 21 is made of such length as to hold the electrodes apart for the desired period. When roller 24 rides off cam 21, spring 28 again forces the parts into abutment and since the arc has by this time raised them both to their respective welding temperatures, they are immediately welded together.

The current may be continued for a short time, such as 0.1 second, after the parts have come together, after which time cam 30 opens switch 29, thus opening the welding circuit. The pressure on the parts is maintained for a further period to allow them to cool somewhat and allow the weld to strengthen, after which cam 34 operates levers 37 and 38 to release the part from chuck 11. Finally cam 22 engages roller 24 to retract slide 12 and withdraw the parts from chuck 11. At the same time shield 36 is raised by cam 33 and immediately thereafter non-repeat clutch 18 is disengaged by the end of lever 19 having finished one complete cycle.

Figure 4 shows graphically the pressure and current sequence during the welding cycle described above.

The present process is especially useful and advantageous in welding dissimilar metals which do not weld readily except at extremely high temperatures or whose melting points are widely divergent. By arranging the polarity so that the D. C. arc heats the more refractory metal to a higher temperature than the metal to be welded to it, it is often possible to reach satisfactory welding temperatures for both metals. Further control of the welding can be achieved by regulating the welding conditions such as arc gap, arcing period and preliminary and final current periods.

It sometimes happens that metals are required to be welded which are deleteriously affected by overheating. The present process frequently makes it possible to obtain satisfactory welding of such parts. The timing of the welding operation is also less critical with D. C. welding.

Where one or both of the metals to be welded is readily oxidizable, the welding conditions can be changed to permit the use of an atmosphere of hydrogen or other suitable reducing or inert gas around the parts during welding, as by a nozzle located near the weld junction.

The process and apparatus are especially well suited to the manufacture of composite center electrode rods for spark plugs wherein the body may be of ferrous or nickel base material tipped with tungsten or a refractory base metal composition comprising molybdenum, tungsten or their compounds. In some cases the refractory material may be bonded with a lower melting point binder of platinum, palladium, gold, silver, copper or their alloys, the refractory content preferably exceeding 70% of the composition.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. The method of welding together dissimilar metals, one of said metals having a higher melting point than the other which comprises making said higher melting point metal the anode and said other metal the cathode in a D. C. circuit, creating an arc therebetween to cause unequal heating thereof, whereby said higher melting point metal is raised to a higher temperature than said other metal, maintaining said arc until said metals reach welding temperatures and then pressing said metals into contact to complete the weld.

2. The method of butt welding metal rods of dissimilar composition together which comprises connecting the more refractory of said rods to the positive terminal of a D. C. source, connecting the other of said rods to the negative terminal of said source, creating a D. C. arc between adjacent ends of said rods to heat the ends to welding temperatures, and then forcing said ends together to complete the weld while they are at welding temperatures.

3. The method of butt welding metal rods of dissimilar metallurgical composition together end to end which comprises bringing said rods into end-to-end abutment, connecting the positive terminal of a D. C. source to the more refractory of said rods and the negative terminal of said source to the other of said rods, separating said rods slightly to draw an arc between adjacent ends thereof, maintaining said arc until said ends reach their respective welding temperatures, then forcing said ends together to complete the weld.

4. The method of butt welding metal rods of dissimilar metallurgical composition together end to end which comprises bringing said rods into end-to-end abutment, connecting the positive terminal of a D. C. source to the more refractory of said rods and the negative terminal of said source to the other of said rods, separating said rods slightly to draw an arc between adjacent ends thereof, maintaining said arc until said ends reach their respective welding temperatures, then forcing said ends together to complete the weld, and maintaining the connection to said D. C. source for a short period after said ends are forced together.

5. The method of butt welding a tungsten rod to a nickel alloy rod which comprises connecting the positive terminal of a D. C. source to said tungsten rod, connecting the negative terminal of said source to said nickel alloy rod, drawing an arc between adjacent ends of said rods to cause heating thereof to their respective welding temperatures and then forcing said ends into abutment to complete the weld.

6. The method of butt welding a tungsten rod to a nickel base alloy rod which comprises bringing said rods into end-to-end abutment, connecting the positive terminal of a 25 to 50 volt D. C. source to said tungsten rod and the negative terminal of said source to said nickel alloy rod, separating said rods slightly to draw an arc between the adjacent ends thereof, maintaining said arc until said ends reach their respective welding temperatures, then forcing said ends together to complete the weld.

EDMAN FRANCIS HOLT.